(12) United States Patent
Sakuyama

(10) Patent No.: US 7,984,841 B2
(45) Date of Patent: Jul. 26, 2011

(54) MEMBER FORMED WITH COATING FILM HAVING TIN AS ITS MAIN COMPONENT, COATING FILM FORMING METHOD AND SOLDERING METHOD

(75) Inventor: Seiki Sakuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 357 days.

(21) Appl. No.: 11/917,427

(22) PCT Filed: Jun. 17, 2005

(86) PCT No.: PCT/JP2005/011150
§ 371 (c)(1),
(2), (4) Date: Mar. 20, 2008

(87) PCT Pub. No.: WO2006/134665
PCT Pub. Date: Dec. 21, 2006

(65) Prior Publication Data
US 2010/0089982 A1 Apr. 15, 2010

(51) Int. Cl.
*B23K 31/02* (2006.01)
*B23K 1/00* (2006.01)
*B32B 15/01* (2006.01)

(52) U.S. Cl. ............... 228/256; 228/262.3; 228/262.31; 428/646; 428/647

(58) Field of Classification Search .................. 228/256, 228/262.3, 262.31; 428/646, 647
See application file for complete search history.

(56) References Cited

U.S. PATENT DOCUMENTS

| | | | |
|---|---|---|---|
| 6,521,176 B2 | 2/2003 | Kitajima et al. | |
| 6,758,387 B1 * | 7/2004 | Zen | 228/180.1 |
| 6,773,827 B2 * | 8/2004 | Higuchi | 428/646 |
| 2002/0001712 A1 | 1/2002 | Higuchi | |
| 2003/0226758 A1 | 12/2003 | Egli | |

FOREIGN PATENT DOCUMENTS

| | | |
|---|---|---|
| JP | 4329891 A | 11/1992 |
| JP | 200126898 A | 1/2001 |
| JP | 2001276996 A | 10/2001 |
| JP | 2001335987 A * | 12/2001 |
| JP | 2003332391 A * | 11/2003 |
| JP | 2004124249 A | 4/2004 |
| JP | 2004223559 A | 8/2004 |

OTHER PUBLICATIONS

Dittes et al., "Tin Whisker Formation- Results, Test Methods and Countermeasures", Proceedings of 53rd Electronic Components and Technology Conference, 2003, p. 822-826.*
International Search Report of PCT/JP2005/011150, date of mailing Aug. 2, 2005.

* cited by examiner

*Primary Examiner* — Jessica L Ward
*Assistant Examiner* — Devang R Patel

(57) ABSTRACT

A member having a coating film capable of suppressing whisker generation is provided. The coating film (3) including a plurality of crystalline grains (3a) made of tin or tin alloy is formed above the surface of the base member (1). An intermetallic compound (3b) of tin and the first metal is being formed along the crystalline grain boundaries of the coating film.

5 Claims, 4 Drawing Sheets

MEMBER FORMED WITH COATING FILM HAVING TIN AS ITS MAIN COMPONENT, COATING FILM FORMING METHOD AND SOLDERING METHOD

TECHNICAL FIELD

The present invention relates to a member formed with a coating film having tin as its main component, and more particularly to a member plated by using a material as a substitute for tin-lead plating. The present invention relates also to a method of forming a coating film and a soldering method for the member.

BACKGROUND

Tin-lead solder plating has been conducted conventionally for connector terminals, semiconductor integrated circuit lead frames and the like. For the recent viewpoint of environmental protection, studies have been made on usage of tin (Sn) plating, tin-copper (Sn—Cu) alloy plating, tin-bismuth (Sn—Bi) alloy plating, tin-silver (Sn—Ag) alloy plating and the like not containing lead, as a substitute for tin-lead solder plating. A technique of Sn—Cu alloy plating is disclosed in Patent Document 1 described below.

If a coating film is made of the above-described alloy not containing lead, needle-like tin crystals called whiskers are likely to be generated. As whiskers are generated and grown, an electric short circuit failure may occur between adjacent electrodes. Since a whisker is as fine as about 1 μm and has a length of 1000 μm or longer in some cases, the whisker may be came off from the coating film and dispersed. Dispersed whiskers may cause a short circuit failure in or out of the apparatus.

One of the reasons of generating whiskers is an internal stress of a plated coating film. While tin recrystallizes by using the internal stress as a drive force, whiskers are grown. The internal stress of a plated coating film is accumulated by strain caused by lattice mismatch between an underlying metal film and a plated coating film, strain caused by eutectoid of additive of plating solution, strain caused by fine crystalline grains formed by brightener added to plating solution, and other strain. It is said that the larger the internal stress, i.e., strain, in a plated coating film is, recrystallization progresses in shorter time, and whiskers are likely to be grown.

The internal stress can be relaxed by non-gross plating which uses plating solution reducing brightener extremely or by semi-gross plating. It is confirmed that generation of whiskers can be effectively suppressed by adopting an approach to relaxing stress by performing heat treatment at about 150° C. after plating.

[Patent Document 1] JP-A-2001-26898

SUMMARY

It is expected that generation of whiskers can be suppressed by relaxing the internal stress in a plated coating film. However, although generation of whiskers can be suppressed to some extent, the effects of this cannot be said sufficient.

Therefore, one possible object is to provide a member having a coating film capable of suppressing whisker generation. Another possible is to provide a method of forming a coating film of this kind. Still another possible object is to provide a soldering method for this member.

The present invention is directed to various embodiments of a base member, a coating film forming method and a soldering method that includes a base member; and a coating film disposed above a surface of the base member, the coating film comprising a plurality of crystalline grains made of tin or tin alloy, and an intermetallic compound of tin and a first metal being formed along crystalline grain boundaries.

As the intermetallic compound is formed along the crystalline grain boundaries of the coating film, a migration of a tin atom through the grain boundaries is restricted. It is therefore possible to suppress whisker generation. Before solder is put, a heat treatment is performed to move the intermetallic compound to the base member side. It is therefore possible to prevent solder wettability from being lowered by the influence of the intermetallic compound.

DESCRIPTION OF THE PREFERRED EMBODIMENTS

Figure 1A:
FIGS. 1A to 1C are cross sectional views of a base member and a coating film illustrating a coating film forming method according to an embodiment.
Figure 1B:
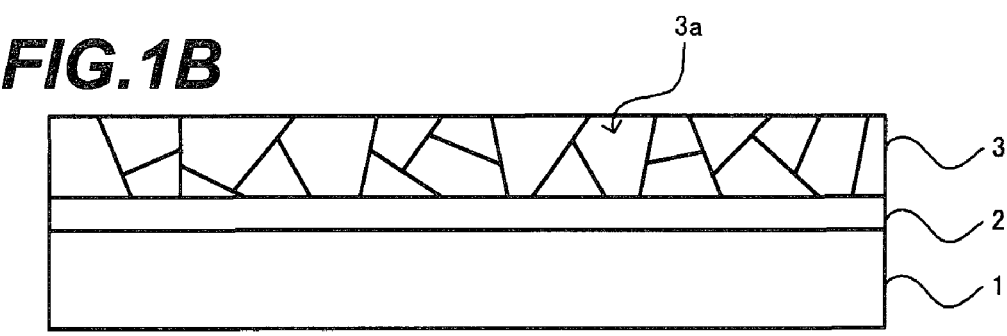
Figure 1C:
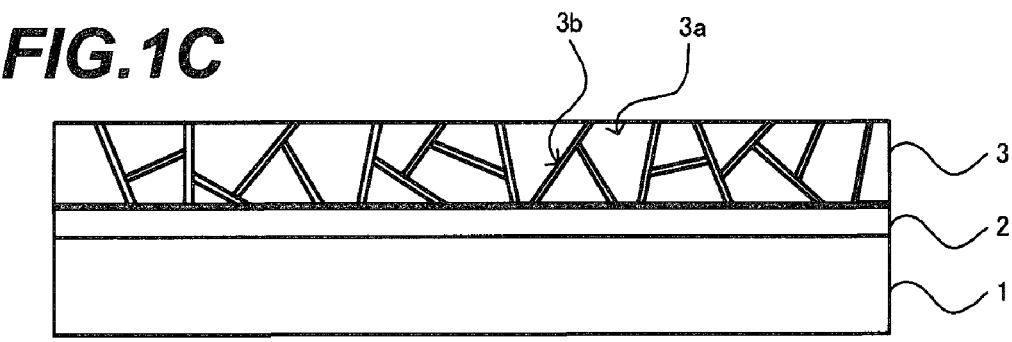

With reference to FIGS. 1A to 1C, description will be made on a coating film forming method according to an embodiment.

As shown in FIG. 1A, a base member 1 on which a coating film is formed is prepared. The base member 1 used in the embodiment is a 28-pin connector terminal member made of phosphor bronze. First, as a plating pre-process, a cathode electrolytic degreasing process is executed for the base member 1. Electrolytic degreasing agent may be Cleaner 160 manufactured by Meltex Inc. For example, a process temperature is 65° C., a current density is 2.5 A/dm$^2$, and a process time is 30 seconds. After the electrolytic degreasing process, the base member 1 is water-washed.

Next, the base member is subject to chemical polishing. Polishing chemicals may be 50% CPB40 manufactured by Mitsubishi Gas Chemical Company Inc. For example, a temperature of chemicals is set to approximately the room temperature, and an immersion time is set to 20 seconds. After chemical polishing, the base member 1 is water-washed.

An underlying layer 2 made of nickel (Ni) is formed on the surface of the base member 1 by electrolytic plating. For example, mixed solution of nickel sulfamate 370 g/L, nickel chloride 10 g/L and boric acid 40 g/L can be used as plating solution. For example, a temperature of plating solution is 50° C., a current density is 2 A/dm$^2$ and a plating time is 360 seconds. Under these conditions, the underlying layer 2 having a thickness of about 2 μm is formed.

After the underlying layer 2 is formed, the base member is water-washed and then an acid activation process is executed. The acid activation process is executed by immersing the base member in a processing liquid made of sulfuric acid having a concentration of 10% for 30 seconds at the room temperature. After the acid activation process, the base member is water-washed.

As shown in FIG. 1B, the surface of the underlying layer 2 is Sn-plated to form a coating film 3 made of Sn. PF-ACID having a concentration of 5% and manufactured by Ishihara Chemical Company Ltd can be used as plating solution. For example, a process temperature is the room temperature and a process time is 15 seconds. Under these conditions, the coating film 3 having a thickness of about 3 μm is formed. As schematically shown in FIG. 1B, the coating film 3 is constituted of a plurality of crystalline grains 3a. After the coating film 3 is formed, heat treatment is performed for 8 minutes at a temperature of 70° C.

FIG. 1C is a cross sectional view after the heat treatment. Ni atoms constituting the underlying layer 2 diffuse along grain boundaries between the crystalline grains 3a so that intermetallic compound 3b of tin and nickel is formed along crystalline grain boundaries and at the interface between the underlying layer 2 and coating film 3.

Figure 2A:
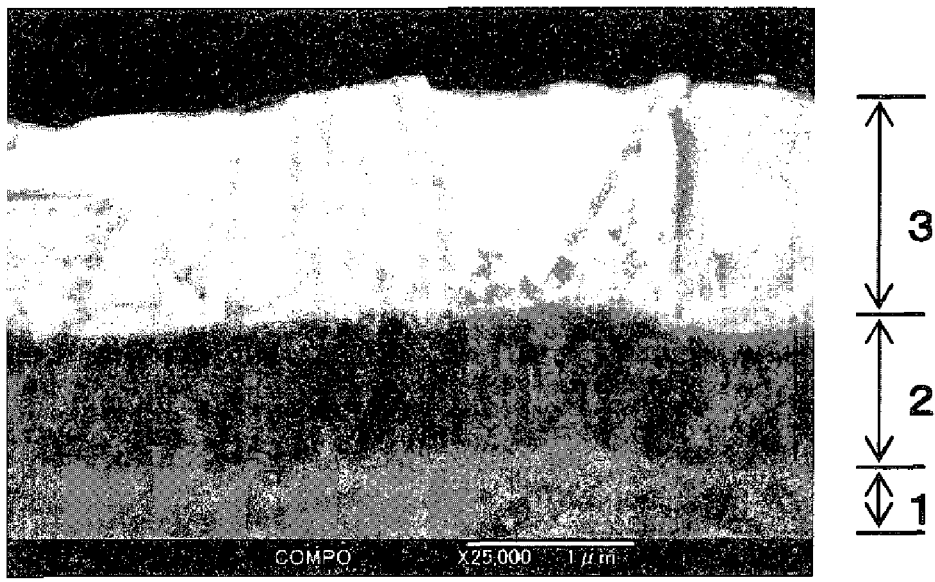
FIG. 2A is a microscopic photograph showing the cross section of a coating film formed by the embodiment method.

FIG. 2A is a microscopic photograph showing the cross section of the connector terminal member manufactured by the embodiment method described above. The base member 1 of phosphor bronze, the underlying layer 2 of nickel, and the coating film 3 of tin can be observed. It can be seen that the coating film 3 is constituted by a plurality of crystalline grains, and Sn—Ni intermetallic compound is formed along the crystalline grain boundaries and at the interface between the coating film 3 and underlying layer 2.

Figure 2B:
FIG. 2B is a microscopic photograph showing the surface of a base member after crystalline grains of a coating film are etched.

FIG. 2B is a microscopic photograph showing the surface of the coating film after Sn crystalline grains were etched with acid and removed. The Sn—Ni intermetallic compound is not etched and remains. It can be seen that the intermetallic compound is not a dot or line shape, but is a thin piece shape (flake shape) extending in a plane.

Since the Sn—Ni intermetallic compound of the flake shape is formed along the crystalline grain boundaries of the coating film 3, generation of whiskers can be suppressed. In the following, description will be made on the reason why whisker generation is suppressed.

A whisker grows while Sn recrystallizes. Recrystallization is a phenomenon that crystalline grains accumulating internal stress are replaced with new crystals by generation of new crystal nuclei without internal strain and by growth of grains. As a whisker is generated from some crystalline grain, this whisker is grown longer because Sn atoms are supplied from crystalline grains adjacent to the subject crystalline grain. In this embodiment, the intermetallic compound 3b of the flake shape formed along the crystalline grain boundaries prevents transfer of Sn atoms. Therefore, even if a whisker is generated, its growth is stopped immediately.

Further, Sn atoms have a faster diffusion speed along the grain boundaries than that in crystalline grains. Therefore, Sn atoms diffuse generally along the crystalline grain boundaries so that growth of a whisker progresses. In the coating film 3 formed by the embodiment method, the intermetallic compound 3b formed along the crystalline grain boundaries suppresses diffusion of Sn atoms. It is therefore possible to prevent growth of a whisker.

Furthermore, the intermetallic compound 3b formed along the crystalline grain boundaries captures Sn atoms diffusing along the grain boundaries. It is therefore possible to suppress generation of Sn growth nuclei on the grain boundaries. With the synergetic effects of these, generation and growth of a whisker can be suppressed.

In this embodiment, although the crystalline grains constituting the coating film 3 are made of Sn, Sn alloy may be used which contains Sn as its main component. For example, Sn—Cu alloy (Cu content is 2%), Sn—Bi alloy (Bi content is 2%) or the like may also be used. For example, a coating film made of Sn—Cu alloy may be formed by using plating solution Soft Alloy GTC-21 manufactured by C. Uyemura & Co. Ltd., under the conditions of a temperature of 30° C. and a current density of 3 A/dm$^2$. A coating film made of Sn—Bi may be made of plating solution of mixture of PF-TIN15, PF-BI15 and PF-ACID manufactured by Ishihara Chemical Company Ltd., under the conditions of a temperature of 25° C. and a current density of 2 A/dm$^2$.

Next, with reference to FIG. 3, description will be made on evaluation results of the effects of the coating film forming method of the embodiment. Male and female connectors were formed by using the connector terminal members manufactured by the embodiment method and conventional method. The male and female connectors were fitted together and left for 4000 hours at an ordinary temperature, thereafter, the surfaces of these samples were observed with a microscope having a magnification of 100, and when a whisker was found, the detailed observation was conducted by using a higher magnification microscope.

Figure 3:
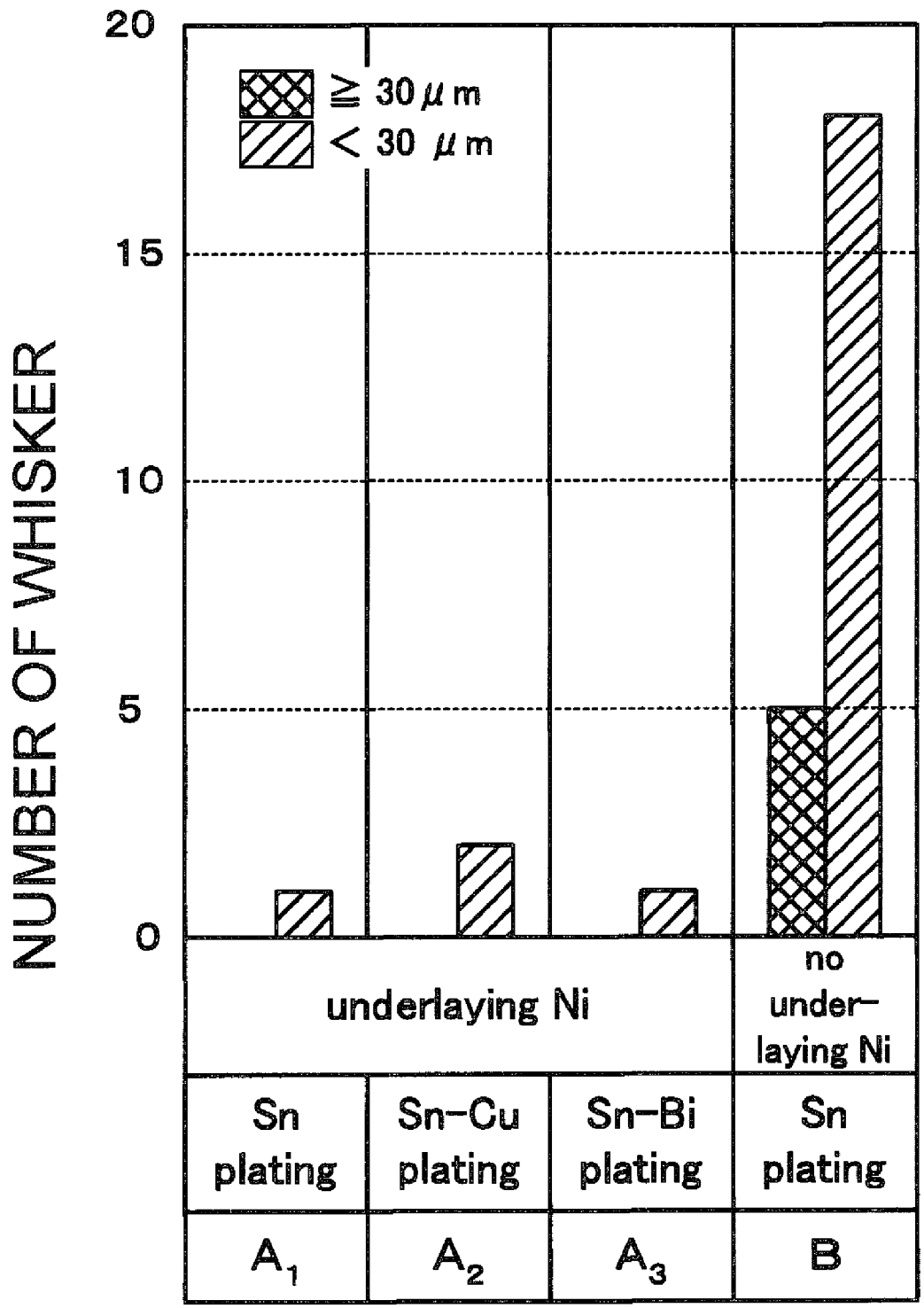
FIG. 3 is a graph showing the numbers of generated whiskers on connector terminal members whose coating films were formed by the embodiment method and a conventional method.

The abscissa of FIG. 3 is divided for four samples A1 to A3 and B. The samples A1 to A3 were manufactured by the embodiment method, i.e., the samples had the Ni underlying layer 2. The sample A1 had the coating film 3 of Sn, the sample A2 has the coating film 3 of Sn—Cu alloy, and the sample A3 had the coating film of Sn—Bi alloy. The sample B did not have the underlying layer 2, and the coating film was made of Sn. A thickness of the coating film was set to 3 μm for each sample. The heat treatment conditions for forming the intermetallic compound of the samples A1 to A3 were a temperature of 70° C. and a process time of 8 minutes.

The ordinate of FIG. 3 is the number of detected whiskers. Bar graphs at the left and right sides of each sample represent the number of whiskers having a length of 30 μm or longer and the number of whiskers having a length shorter than 30 μm, respectively.

In the samples A1 to A3, a whisker having a length of 30 μm or longer was not generated. In contrast, in the sample B without the underlying layer, five whiskers having a length of 30 μm or longer were generated. It is also seen that the number of whiskers having a length shorter than 30 μm is considerably smaller in the samples A1 to A3 with the underlying layer than in the sample B without the underlying layer.

Figure 4A:
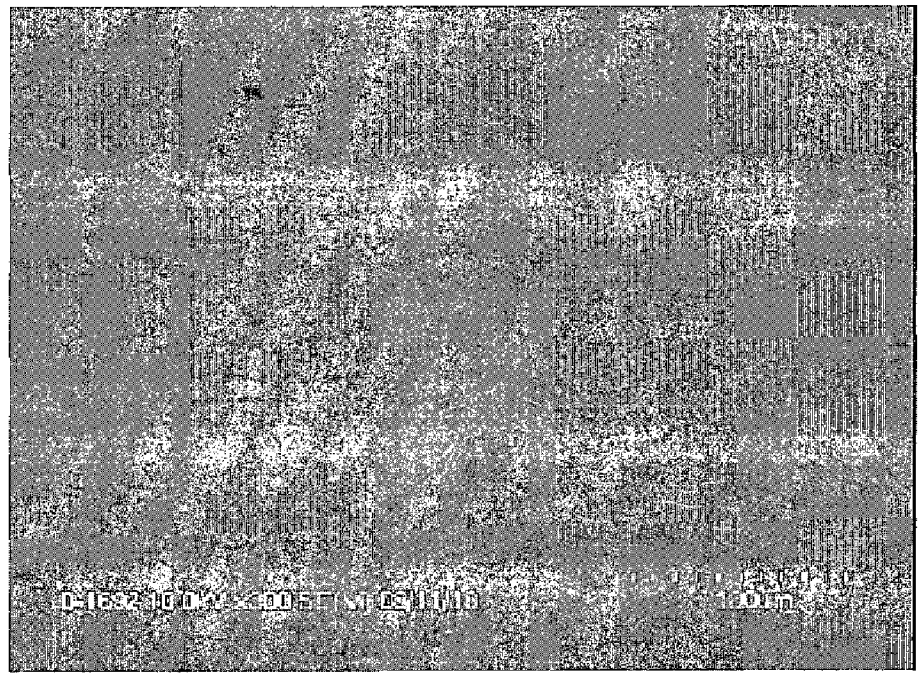
FIGS. 4A and 4B are microscopic photographs showing the coating film surfaces after the coating films formed by the embodiment method and a conventional method were left for some period.
Figure 4B:
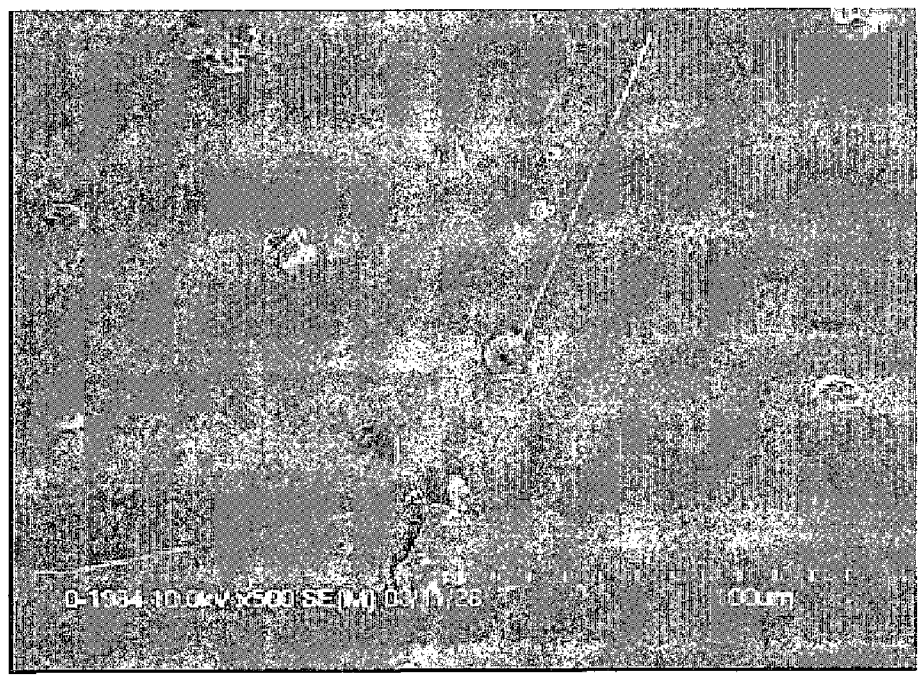

FIG. 4A is a microscopic photograph showing the surface of the sample A1, and FIG. 4B is a microscopic photograph showing the surface of the sample B. It can be seen that a whisker is not observed in the sample A1 and long whiskers are generated in the sample B.

As understood from the evaluation results shown in FIGS. 3 and 4, generation of whiskers can be suppressed by forming the underlying layer of Ni between the base member 1 and coating film 3 and forming the Sn—Ni intermetallic compound 3b along the crystalline grain boundaries of the coating film 3.

In the embodiment, although the underlying layer 2 is made of Ni to form the Sn—Ni intermetallic compound 3b, the underlying layer 2 may be made of metal other than Ni which metal forms an intermetallic compound with Sn. This metal may be gold (Au), copper (Cu), silver (Ag) and palladium (Pd). It is preferable to use the Sn—Ni intermetallic compound from the viewpoint of a high mutual diffusion coefficient and a stable crystalline state.

An element forming a solid solution with Sn may be contained in the intermetallic compound 3b of the flake shape to be formed along the crystalline grain boundaries of the coating film 3. By forming a solid solution by containing an element forming a solid solution with Sn, an ability of the intermetallic compound 3b capturing Sn is enhanced so that the suppression effects of whisker generation can be improved. Elements forming a solid solution with Sn include gold (Au), bismuth (Bi), antimony (Sb), indium (In), zinc (Zn), lead (Pb) and aluminum (Al).

In the above embodiment, after the coating film 3 is formed, the heat treatment for forming the Si—Ni intermetallic compound 3b is performed for 8 minutes at 70° C. Instead, other heat treatment conditions may be adopted. According to the evaluation experiment made by the present inventor, it has been found preferable that a heat treatment temperature is set to 0.65 to 0.80 time a melting point in absolute temperature of crystalline grains constituting the coating film, and a heat treatment time is set to 3 to 30 minutes.

Other heat treatment conditions may be adopted if it is sufficient for Ni atoms in the underlying layer 2 to diffuse to the surface of the coating film 3 along the grain boundaries thereof. For example, if the underlying layer 2 is made of Ni and the coating film 3 is made of Sn, Ni atoms can diffuse to the surface of the coating film 3 if the following conditions are satisfied.

$$D \leq (3.8 \times 10^{-6} \times \exp(-6520/T) \times t)^{1/2}$$

where D is a thickness of the coating film in the unit of "m", T is a heat treatment temperature in absolute temperature, and t is a heat treatment time in the unit of "s".

In the above embodiment, although a thickness of the underlying layer 2 is set to about 2 µm, thickness may be set to another value. It is however preferable that a film thickness is set so that Ni atoms can be supplied so as to form the intermetallic compound 3b reaching the upper surface of the coating film 3.

Next, description will be made on a soldering method for the surface of the connector terminal member formed by the embodiment method.

Before a soldering process is executed, heat treatment is performed at a temperature of at least 0.85 times a melting point in absolute temperature of crystalline grains constituting the coating film 3. With this heat treatment, Sn—Ni intermetallic compound formed along the crystalline grain boundaries moves toward the interface between the underlying layer 2 and coating film 3. Thereafter, the soldering process is executed. Since the intermetallic compound has moved to the underlying layer 2 side, the intermetallic compound does not adversely affect a solder wettability of the surface of the coating film 3. This heat treatment is required to be performed at a temperature lower than a melting point of the base member 1. Further, it is preferable the heat treatment is performed at a temperature lower than the melting point of crystalline grains constituting the coating film 3.

The connector terminal member formed with the coating film by the embodiment method was subject to heat treatment for 10 minutes at a temperature of 150° C., and solder was put on the surface. It has been confirmed that good solder wettability can be obtained.

In the above embodiment, although the base member 1 made of phosphor bronze is used, the base member may be made of other material. For example, by using a base member of brass, a coating film was formed by the same method as the embodiment method. It was possible to suppress whisker generation as in the case of the above embodiment.

In the above embodiment, descriptions are made about manufacturing the connector terminal members for one example. The method for forming the coating film according to the above embodiments can be applicable to forming the coating film on other metal members. For example, it can be applicable to forming lead frames for semiconductor integrated circuit.

The present invention has been described with reference to the embodiment. The present invention is not limited only to the embodiment. For example, it is obvious for those skilled in the art that various modifications, improvements, combinations and the like are possible.

What are claimed are:

1. A soldering method comprising:
    forming over a base member an underlying layer containing a first metal capable of forming an intermetallic compound with tin;
    forming a coating film on the underlying layer by plating tin or tin alloy;
    forming a soldering terminal by performing a first heat treatment under a condition that the first metal in the underlying layer diffuses in crystalline grain boundaries of the coating film and intermetallic compound of tin and the first metal is formed along the crystalline grain boundaries of the coating film;
    after the first heat treatment, lowering a temperature of the soldering terminal to ambient temperature;
    after lowering the temperature of the soldering terminal, heating the soldering terminal at a temperature of at least 0.85 times a melting point in absolute temperature of the crystalline grains of the coating film, to thereby move the intermetallic compound toward an interface between the underlying layer and the coating film; and
    putting melted solder on a surface of the soldering terminal.

2. The soldering method according to claim 1, wherein the first metal is nickel.

3. The soldering method according to claim 1, wherein the intermetallic compound has a flake shape.

4. The soldering method according to claim 1, wherein the first heat treatment is performed for 3 to 30 minutes.

5. The soldering method according to claim 1, wherein the first metal in the underlying layer diffuses to a top surface of the coating film along the crystalline grain boundaries of the coating film during the first heat treatment.

* * * * *